UNITED STATES PATENT OFFICE.

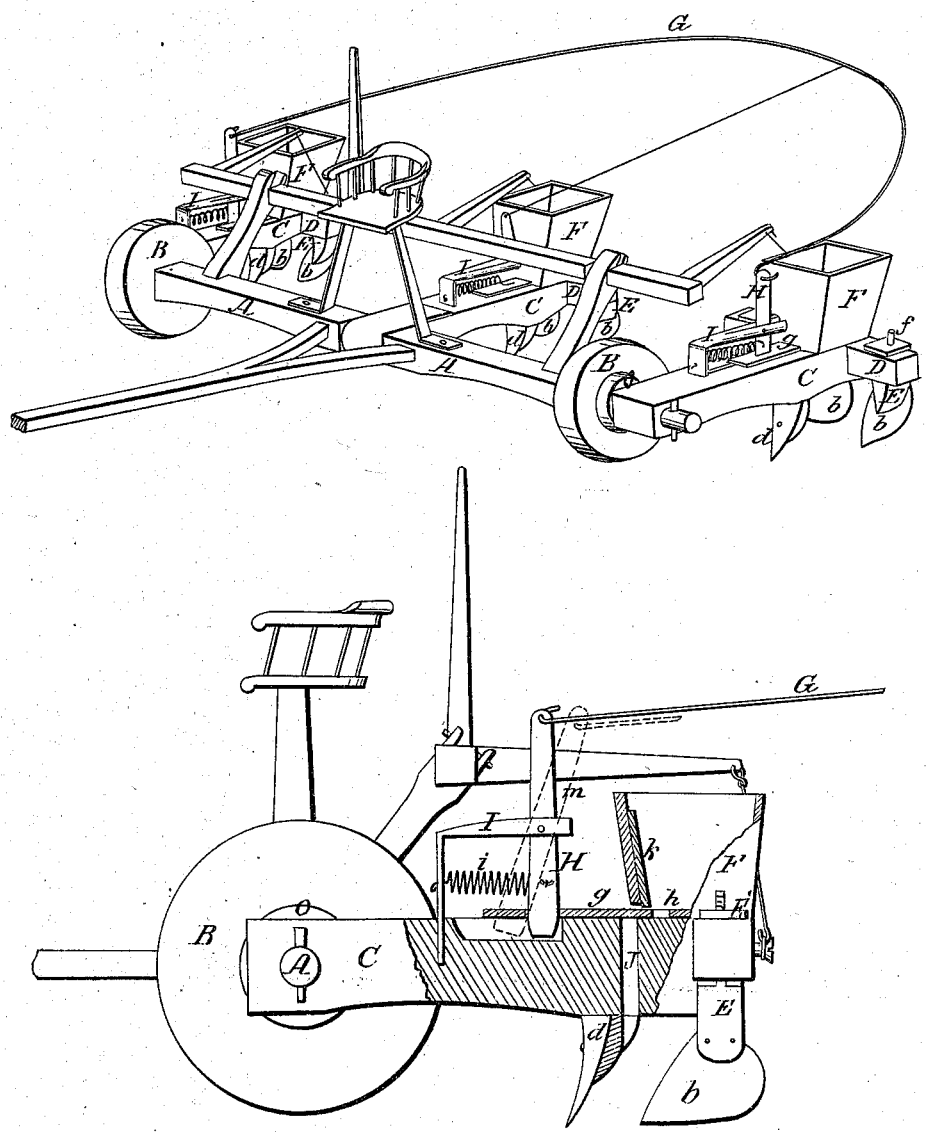

ELIAS BARTO, OF TIFFIN, OHIO.

IMPROVEMENT IN CORN MARKER, PLANTER, AND CULTIVATOR.

Specification forming part of Letters Patent No. 89,843, dated May 11, 1869.

*To all whom it may concern:*

Be it known that I, ELIAS BARTO, of Tiffin, in the county of Seneca, State of Ohio, have invented certain new and useful Improvements in Machines for Marking Furrows, Planting, and Cultivating Corn; and I hereby declare that the following is a full, clear, and exact description thereof, reference being had to the accompanying drawings, and to the letters of reference marked thereon.

My inventions are improvements upon my invention patented to me and secured by Letters Patent issued from the United States Patent Office November 10, 1868, and numbered 83,905.

The nature of my invention consists in the construction of a machine which combines all the requisites for marking the furrows, dropping and covering the corn, and which may be used as a cultivator when that is required.

In order to enable others skilled in the art to make and use my invention, I will now proceed to describe its construction and operation, reference being had to the annexed drawings, which form a part of this specification, and in which—

Figure I is a perspective view of my machine as arranged for planting. Fig. II is a side view, with a portion shown in section, showing the beam C, the hopper F, cut-off slide $g$, and other internal arrangements for dropping the seed into the hill.

I construct my machine by providing an axle, A, with small wheels B B, so as to bring the whole near the ground. To the axle I attach the beams C C C, three or more, as desired, (but always the outside beam, as shown in Fig. 1,) by having the ends of the axle pass through the ends of the beams, and secured by means of a pin. I also provide washers $a$ $a$, one or more, to be used at each end, which may be put either side of the beams, and thus increase or decrease the distance between the furrows. The center beam I secure by means of a band passing round the axle. At the rear ends of beams C C C, I provide cross-beams D D D. In each combined beam and cross-beam I have three knives or blades.

$d$ is the forward blade or shovel, which makes the furrow, and $b$ $b$ the side blades, which cover the seed. The side blades are so constructed and shaped that when the points are turned in, they throw the earth in and over the seed; but when they are changed from side to side and the points turned outward they act as plows, and are used when the machine is used as a cultivator.

When the machine is used as a marker or to make the first furrows I remove the blades $b$ $b$ on block E, leaving the shovel $d$.

On the ends of the beams C C C, and above the blades or shovels, are attached the hoppers F F F, which contain the seed to be planted.

In Fig. II, I represent the operation of the hopper and slide $g$. In the slide $g$ is a hole or "bucket" sufficiently large to contain the requisite number of kernels for one hill, and is represented by letter $h$. The cut-off slide $g$ is held in position by a spring, $i$.

On the front side of the hopper is a gum-elastic strike, or a brush of bristles, resting on the top of the slide $g$, as represented by letter $k$. This strike or brush removes all the seed from the slide, leaving only the few grains in the bucket. When the slides are drawn out, as the hole or bucket $h$ comes over the discharging-tube $j$ the seed drops at once into the hill, immediately in front of the covering-blades $b$ $b$.

To work the cut-off I have a pivoted lever, H, attached to an elbow, I, to one end of which is attached the slide $g$ and to the other my bail G, which extends to the rear of my machine, and is operated by a man walking behind the machine. When the discharging-tube $i$ comes over the furrow where the hill is to be the operator gives a sudden jerk with the bail G, which draws out the seed and drops it, the motion of which will be seen by the dotted lines $m$. As there is no hole in the bottom of the hopper no more seed than is required can fall, and as the machine is made low the seed, falling but a short distance, does not scatter more than is desired, which are great advantages over all other machines. As soon as the machine passes the furrow the operator yields the bail and the spring forces the slide back to fill again.

Another great advantage of my machine over others is that the operator walks behind the machine, where he can see just when the hoppers are over the furrows, and can drop the seed exactly in the hills, while one riding cannot see, and consequently cannot drop the seed in a direct line at all times.

I do not confine myself to three beams, but may use any number; and as each beam operates independently I can use as many as I desire, and changing the blades b b from side to side, as before mentioned, I have three or more cultivators. The blades b b are adjusted by means of a nut, E, and screw f, so they are easily removed.

Having thus fully described my invention, what I claim as new, and desire to secure by Letters Patent, is—

The cut-off slide g, with hole or bucket h, discharging-tube j, spring i, elbow I, lever H, bail G, and gum-elastic strike k, together with the hopper F, for the use and purpose as specified and herein set forth.

In testimony whereof I have signed my name to this specification in the presence of two subscribing witnesses.

ELIAS BARTO.

Witnesses:
EDM. F. BROWN,
HENRY C. DANE.